US009571664B2

(12) United States Patent
Mathison et al.

(10) Patent No.: US 9,571,664 B2
(45) Date of Patent: Feb. 14, 2017

(54) RELIABLE ACTIVATION OF MOBILE DEVICES

(71) Applicant: Verizon Patent and Licensing Inc., Arlington, VA (US)

(72) Inventors: James Mathison, Basking Ridge, NJ (US); Satish B. Mistry, Warren, NJ (US); Zhengfang Chen, Basking Ridge, NJ (US); Taussif Khan, Basking Ridge, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/720,504

(22) Filed: May 22, 2015

(65) Prior Publication Data

US 2016/0344872 A1 Nov. 24, 2016

(51) Int. Cl.

*H04M 11/00* (2006.01)
*H04M 15/00* (2006.01)
*H04W 4/00* (2009.01)

(52) U.S. Cl.

CPC ......... *H04M 15/715* (2013.01); *H04M 15/705* (2013.01); *H04M 15/887* (2013.01); *H04W 4/001* (2013.01)

(58) Field of Classification Search

CPC H04M 15/715; H04M 15/705; H04M 15/887; H04W 4/001
USPC ..................... 455/406, 418, 435.1, 411, 434, 414.1,455/433, 450; 370/329, 330, 352, 230, 336, 370/311, 331, 252
See application file for complete search history.

(56) References Cited

U.S. PATENT DOCUMENTS

| | | | | |
|---|---|---|---|---|
| 8,886,183 B2 * | 11/2014 | Lindholm | H04W 8/183 | 455/432.1 |
| 9,084,155 B2 * | 7/2015 | Rubin | H04W 28/20 | 455/437 |
| 2012/0077468 A1 * | 3/2012 | Fan | G07C 9/00309 | 455/414.1 |
| 2012/0155324 A1 * | 6/2012 | Janakiraman | H04L 43/028 | 370/254 |
| 2013/0231080 A1 | 9/2013 | Cheuk et al. | | |
| 2014/0045474 A1 * | 2/2014 | Cheuk | H04W 8/265 | 455/418 |
| 2015/0148024 A1 * | 5/2015 | Jiao | H04W 8/22 | 455/418 |

FOREIGN PATENT DOCUMENTS

CN WO2014005551 * 1/2014 ............. H04W 8/22

* cited by examiner

*Primary Examiner* — Dhaval Patel

(57) ABSTRACT

A system and method are provided for reliable activation and attachment of mobile devices. An activation server receives, from a client device, a subscription request for accessing a network, wherein the subscription request includes a first identifier of the client device. The activation server determines, based on the first identifier, whether a pending subscription account exists or a new subscription account is to be created. Upon determining that the pending subscription account exists or the new subscription account is to be created, the activation server releases the pending subscription account or creates the new subscription account, and instructs the client device to remove a second identifier from the client device and to use the first identifier for attaching to the network.

22 Claims, 8 Drawing Sheets

RELIABLE ACTIVATION OF MOBILE DEVICES

BACKGROUND

In recent years, mobile wireless communications have become increasingly popular. Initial implementations of mobile wireless communications, for example in the form of cellular telephone networks, supported circuit switched voice communication services. Wireless communication devices such as mobile or "cell" phones have expanded greatly in functionality over the last decade. For example, wireless network carriers developed short message service (SMS) technology to provide text and/or e-mail communications via the wireless communication networks. As the public wireless communication networks have evolved to provide greater bandwidth and packet based services, the industry has developed a variety of data services, such as web browsing, as well as a variety of services using Multimedia Message Service (MMS) technology.

Customers are typically required to go through various cumbersome activation processes in order to connect a new mobile device to a wireless network. One such process is store activation, where a customer enters a store to activate the Subscriber Identity Module (SIM) card with the device. The SIM typically includes a secure storage that is generally used for storing an International Mobile Subscriber Identity (IMSI) and a network hash key used in identifying and authenticating the mobile station on a particular wireless carrier network. Customers also typically utilize a customer care call for activation. For this process, a customer calls a customer service or care facility for activation of the SIM card with the device. Internet activation is also typically used, where a customer activates the SIM card for the device by navigating a website provided by or for the network provider. Another type of common activation process is a pre-activated SIM card. For this, a customer purchases a pre-activated SIM card with a selected price plan. While providing for activation of the SIM cards used with the wireless devices, such techniques typically involve reliance on customer service representatives, and may not be convenient for the customers.

Hence, a need exists for an improved process for allowing a user of a mobile device to activate the mobile device for operation.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
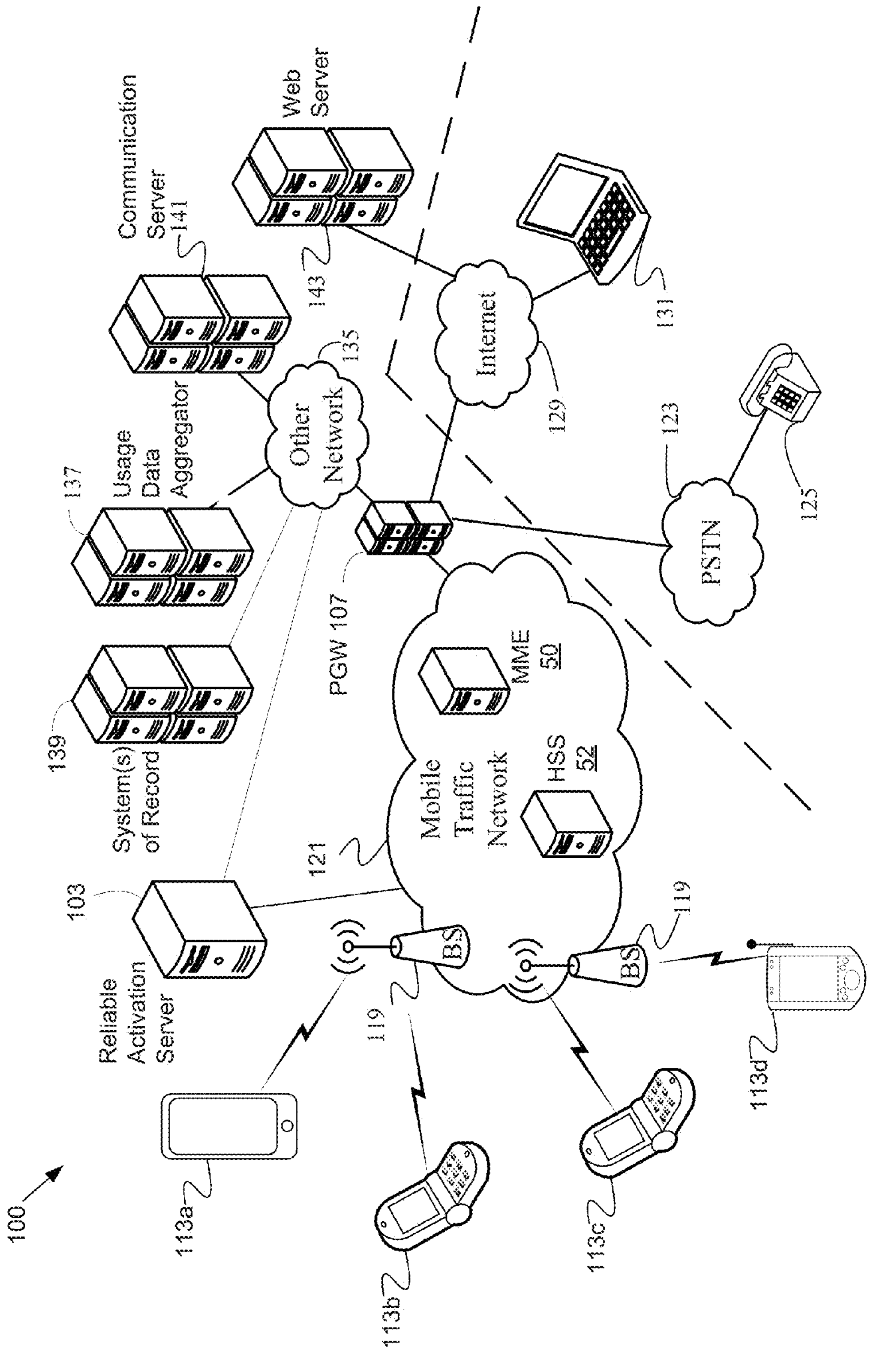
FIG. 1 illustrates a wireless packet data communications network for providing a mobile communications for mobile devices as well as a system providing a framework for self-activation of a mobile device.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples discussed below allow a user of a mobile device to activate the device for operation by a process of self-activation, without requiring the user to gain separate access to the Internet such as by a personal computer or that the user rely on a sales representative for activation of the mobile device. Systems and methods in accordance with the present disclosure provide for self-activation of a Subscriber Identity Module (SIM) card used with the mobile device (self-activation) through the Internet or through a device client resident on the mobile device. The SIM card may be activated when the mobile device attempts to connect to a network for the first time. Alternatively or additionally, the SIM card may be activated after a change in the mobile device's service subscription. By activating the SIM card, the SIM card may be associated with a new subscription account or may be associated with an updated subscription account based on a change in mobile device's service subscription. After activation, the mobile device may use services provided by the network based on the mobile device's new or updated subscription.

As used herein, the terms "activate" or "activation" may reference, among other things, adding a mobile device to a subscription account, allowing the mobile device to use network services, such as voice, data, or text messaging services, associated with the subscription account. The mobile device may be identified by an identifier of the mobile device (e.g., manufacturer identifier, International Mobile Equipment Identity (IMEI), International Mobile Subscriber Identity (IMSI) or other identifiers described herein) that is hard wired into the mobile device or by a SIM card or other token that is inserted into the mobile device.

The terms "attach" or "attachment" may reference, among other things, a mobile device connecting to a network. After attachment, the mobile device may be provided, via the network, with a limited interface for activation of the mobile device. The limited interface may provide an activation application and possibly other necessary applications, but might not provide an interface for certain cellular functions, such as making non-emergency calls. A mobile device that is not yet associated with a subscriber account may be able to attach to a network, such that it may be associated with a subscriber account by a user of the mobile device. Similarly a mobile device that has been deactivated and not yet reactivated, may be provided with limited access to the network, to allow the user to create a subscription account or associate the device with an existing account. According to some implementations, activation requests are handled at an information technology (IT) activation server. Attachment requests are handled at a Home Subscriber Service (HSS). The HSS may be accessible to the mobile device not directly but via a Mobility Management Entity (MME). Alternatively, other machines may handle activation or attachment requests.

The terms "subscribe" or "subscription" may reference, among other things, a selection of a network access plan, including a calling plan, a data plan or a texting plan, for a mobile device. Subscription may take place in person at a brick-and-mortar store, over the Internet, or via a call to a customer service number from a mobile or landline phone. According to some implementations, subscription may take place using a mobile device which will later be used to access the network with the network access plan.

In one aspect, the mobile device user activates a SIM card used with the device (self-activation) through the Internet or through the device client, without a need for assistance from a customer service representative such as at a store or service center. For example, a user can purchase (e.g., through the Internet or in a store) a mobile device with a non-activated SIM card. The user can insert the SIM card into the mobile device (if it is not already inserted), and then turn the device on to activate the SIM card. In doing so, the user may use the mobile device to create a new subscription account and associate the SIM card with the new subscription account. In another example, the subscription account may have been previously created by the user and may remain pending for use upon activation of the SIM card. In this scenario, upon receiving the mobile device, for example via mail, the SIM card may be associated with the previously created subscription account.

The device client may detect that the SIM card is self-activation capable, and then provide a customized interface (e.g., a sequence of user interface screens) to walk the customer/user through the self-activation process. The activation interface may provide various features of a service subscription such as price plan options and/or other offerings, which may be dependent on the make and model of the mobile device as recognized by the device client. The activation interface may include a sequence of user input screens for selecting features associated with subscription of the mobile device within the carrier's wireless network. The customer/user may correspondingly select a desired price plan and/or other available features through the interface. Upon creation of the desired service subscription, the subscription plan may be stored at the network (e.g., at a subscription management server of the network) in association with the SIM card.

In cases where a service subscription order has been previously placed by the user prior to receiving the mobile device, the desired price plan and features may have been selected during the subscription order. The user may still be given an option to update the previously selected plan and features or approve them. The SIM card of the mobile device can then be associated with the subscription plan. Accordingly, the customer/user may self-activate the SIM card, without a need for assistance from a customer service representative at a store or service center.

In one example, an activation method may be initiated on a server in response to receiving a message from a mobile device in a bearer channel of a wireless packet data communication network. A self-activation criterion is then determined from a subscription account for the mobile device stored on the server. The self-activation criterion may determine the mobile device's allowed level and type of access to the server resources. For example, the self-activation criterion may only allow access to a subscription website to allow the mobile device to subscribe to the services provided by the server. Based on the self-activation criterion, a message for activation of the mobile device may be sent from the server to the mobile device within a message in the bearer channel of the wireless packet data communication network. Additional steps may also be provided for such self-activation, as will be described in further detail below.

Reference now is made in detail to the examples illustrated in the accompanying drawings and discussed below. FIG. 1 illustrates a network 100 including a number of mobile devices, which is coupled to other communication networks and several systems/elements associated with or included in the mobile network for various functions as may be involved in providing reliable mobile device activation on networks. The network 100 may be operated by a carrier or service provider to provide a wide range of mobile communication services and ancillary services or features to its subscribers and associated mobile device users. The elements indicated by the reference numeral 100 generally are elements of the network and are operated by or on behalf of the carrier, although the mobile devices typically are sold to the carrier's customers. The mobile communication network 100 provides communications between mobile devices as well as communications for the mobile devices with networks including Public Switched Telephone Network (PSTN) 123 and Internet 129 and stations including fixed line telephone 125 and web server 143 outside the mobile communication network 100.

For purposes of later discussion, several mobile devices (in general, referred to as 113) appear in the drawing, to represent examples of the mobile devices that may receive various services via the mobile communication network 100. Today, mobile devices typically take the form of portable handsets, smart-phones, tablet computers or personal digital assistants (PDAs), although they may be implemented in other form factors, including consumer and business electronic devices. The mobile devices 113*a*, 113*b*, 113*c*, and 113*d*, for example, may take the form of a mobile telephone station, enhanced with display and user input capabilities to support certain text and image communications, such as email, picture communication and web browsing applications. In another example, a mobile device is a portable computing device, specifically, comprising a wireless modem card inserted into a handheld or laptop personal computer (PC) or the like.

Continuing with the description of FIG. 1, the network 100 allows users of the mobile devices to initiate and receive telephone calls to each other as well as through the public switched telephone network (PSTN) and telephone stations connected thereto. The network 100 allows SMS type text messaging between mobile devices and similar messaging with other devices via the Internet. The network 100 can also offer a variety of other data services via the Internet, such as downloads, web browsing, e-mail, etc. The mobile communication network 100 typically is implemented by a number of interconnected networks. Hence, the overall network 100 may include a number of radio access networks (RANs), as well as regional ground networks interconnecting a number of Radio Access Networks (RANs) and a wide area network (WAN) interconnecting the regional ground networks to core network elements, such as the Multimedia Messaging Service Centers (MMSCs). A regional portion of the network 100, serving mobile devices 113*a* to 113*d* will typically include one or more RANs and a regional circuit and/or packet switched network and associated signaling network facilities.

Physical elements of a RAN, operated by one of the mobile service providers or carriers, include a number of base stations represented in the example by the base stations (BSs) 119. Such base stations 119 typically comprise a base transceiver system (BTS) which communicates via an antennae system at the site of base station and over the airlink with one or more of the mobile devices 113*a* to 113*d* when the mobile devices are within range. Each base station 119 typically includes a BTS coupled to several antennae mounted on a radio tower within a coverage area often referred to as a "cell." The BTS is the part of the radio network that sends and receives RF signals to/from the mobile devices that the base station currently serves.

The radio access networks also include a traffic network represented generally by the cloud at 121, which carries the user communications for the mobile devices 113*a* to 113*d* between the respective base stations 119 and other elements with or through which the mobile devices 113*a* to 113*d* communicate. Individual elements such as switches and/or routers forming the traffic network 121 are omitted here for simplicity. The traffic network portion 121 of the mobile communication network 100 connects to PSTN 123. This allows the network 100 to provide voice grade call connections between mobile devices and landline telephones connected to the PSTN 123. The drawing in FIG. 1 illustrates one such telephone at 125. The PSTN 123 also provides connections to other types of customer premises equipment, such as facsimile or 'FAX' machines (not shown).

The wireless mobile communication network 121 might be implemented as a network conforming to the code division multiple access (CDMA) IS-95 standard, the 3rd Generation Partnership Project 2 (3GPP2) wireless Internet Protocol (IP) network standard or the Evolution Data Optimized (EVDO) standard, the Global System for Mobile (GSM) communication standard, a time division multiple access (TDMA) standard, Long-Term Evolution (LTE) standard or other standards used for public mobile wireless communications.

The carrier also operates a number of systems that provide ancillary functions in support of the communications services provided through the network 100, and those elements communicate with other nodes/elements of the network 100 via one or more private IP type packet data networks 135 (sometimes referred to as an Intranet). The support elements, for example, include one or more systems of record, such as the system shown at 139. For example such a system 139 may include subscriber account records. A large carrier typically has a number of such systems, and the system that stores the subscription account data for a particular subscriber may be referred to as the "system of record" for that subscriber's account.

The traffic network portion 121 of the mobile communication network 100 connects to a public packet switched data communication network, such as the network commonly referred to as the "Internet" shown at 129. Packet switched communications via the traffic network 121 and the Internet 129 may support a variety of user services through the network 100, such as mobile device communications of text and multimedia messages, e-mail, web surfing or browsing, programming and media downloading (including audio and video), etc. For example, the mobile devices may be able to receive messages from and send messages to user terminal devices, such as personal computers, either directly (peer-to-peer) or via various servers (not separately shown). The drawing shows one such user terminal device as a personal computer (PC) 131 by way of example.

The network messages used for self-activation, as discussed herein, may be sent to various mobile devices using the packet data network (PDN) 121. The Evolved Packet Core (EPC) of network 121 uses the concept of Evolved Packet System (EPS) bearer channels to route IP traffic from a gateway 107 in the network 121 to the mobile device (e.g. 113*a* to 113*d*). A bearer channel is an IP packet flow with a defined quality of service (QoS) between the Packet Data Network (PDN) Gateway (PGW) 107 and the mobile device (e.g., 113*a* to 113*d*). It is within these packets that messages for self-activation to a mobile device (113*a* to 113*d*) may be sent. The mobile traffic network 121 includes a Mobility Management Entity (MME) 50 that is the key control-node for the mobile traffic network 121. MME 50 may be involved in the bearer activation/deactivation process and may also responsible for choosing the serving gateway (SGW) for a mobile device 113*a*-113*d* when the mobile device is being attached to a server. MME 50 may also be responsible for authenticating a user of mobile device 113*a*-113*d*. To this end, MME 50 may interact with a Home Subscriber Service (HSS) 52 of network 121 or other network 135 where subscriber profiles of the subscribed mobile devices 113*a*-113*d* are stored. The MME 50 and HSS 52 functions described herein are part of the network infrastructure of the mobile traffic network 121 and may be provided using one or more machines connected to the network 121.

In addition, the traffic network portion 121 of the mobile communications network 100 connects to a private data network 135 via a gateway 107. The gateway 107 bridges the networks 121 and 135 and enables traffic to flow between the two networks.

The private data network 135 is in communication with various auxiliary services servers, e.g., such as those providing additional services to the users of the network 100, and/or to operations support personnel of the service provider or carrier that operates the network 100. In an aspect, private data network 135 is in communication with the reliable activation platform 103, the usage data aggregator 137, and the communication server 141.

Servers such as the communication server 141 and the web server 143 may provide any of a variety of common application or service functions in support of or in addition to an application program running on the mobile device 113*a*-113*d*. However, for purposes of further discussion, we will focus on functions thereof in support of the reliable activation of the mobile device 113*a*-113*d* and attachment of the mobile device to a communication server 141 or a web server 143. For a given service, including the reliable activation and attachment service described herein, an application program within the mobile device 113*a*-113*d* may be considered as a 'client application' and the programming at reliable activation platform 103, communication server 141 and web server 143 may be considered as the 'server' application. For the sake of simplicity, the communication server 141 and the web server 143 are referred to as the server 141 and the server 143, hereinafter.

In one example, a self-activation message is embedded in a Protocol Configuration Option (PCO) container in the message provided to the mobile device 113 through a signaling channel. According to the 3GPP standard specification for the Long-Term Evolution (LTE) standard, a PCO can be used to transfer parameters between the mobile device 113 and the PDN gateway (PGW 107). The PCO can be used to share Domain Name (DNS) server addresses with the mobile device 113*a*-113*d* and to provide information about the IMS server address to which the mobile device 113*a*-113*d* should register. The present application, according to some implementations, proposes, among other things, including a self-activation indication as an additional container in the PCO, extending the use of PCO beyond what is specified in the LTE standard.

In some examples, for a mobile device 113*a*-113*d* to be identified by a network such as the cellular network 121, the mobile device 113*a*-113*d* is attached to the network. The attachment process to the network 121 can be performed in different ways. One type of attachment can be performed using an International Mobile Subscriber Identity (IMSI) stored in the SIM card of the mobile device 113*a*-113*d*. IMSI is a unique identification for the mobile device associated with all cellular networks and can be used to uniquely identify the user of a cellular network.

According to some embodiments, when the mobile device 113*a*-113*d* performs IMSI attachment, the MME 50 network element retrieves a fresh copy of a subscriber profile of the mobile device 113*a*-113*d* from its subscription records (e.g., a subscriber database at HSS 52). Based on the subscriber profile, the MME 50 can grant the mobile device 113*a*-113*d* with full access to the network 121 or a limited access in response to the attachment request.

According to the 3GPP standard specification for LTE standard, when a mobile device 113*a*-113*d* is successfully attached to the network 121, a new type of identifier is assigned to the mobile device 113*a*-113*d* by MME 50. The new type of identifier may include a Globally Unique Temporary Identity (GUTI). The GUTI is a temporary identifier assigned to the mobile device 113*a*-113*d* such that the mobile device 113*a*-113*d* can avoid sending its IMSI over the air (to minimize exposure of the sensitive information of the IMSI to any potential eavesdropping). The GUTI may be stored to the mobile device 113*a*-113*d* and may be reused in future attachment procedures, for example, after a power off or reset of the mobile device. In addition, according to some examples, the MME 50 stores the GUTI and the associated subscriber profile in a cache memory for further use.

In normal circumstances when a mobile device 113*a*-113*d* has a valid service subscription with the network 121 (e.g., the mobile device is subscribed to a service provided by the mobile traffic network 121), the IMSI attachment is performed at first time power up of the mobile device, for example, at an out-of-box condition when a GUTI is not available. Subsequent to providing a GUTI to the mobile device 113*a*-113*d* by MME 50 and storage of the GUTI in a memory of the mobile device 113*a*-113*d*, every time the mobile device 113*a*-113*d* connects to the network 121, the GUTI may be used for attachment of the mobile device to network 121.

In cases when a mobile network operator, using HSS 52 functionality, allows only mobile devices with a valid subscription to attach to the network and rejects a mobile device attachment request when the SIM is not subscribed to the network, attachment with GUTI does not lead to a problem. This is because MME 50 has a stored subscriber profile for a mobile device with a valid subscription and the GUTI attachment identifies the mobile device 113*a*-113*d* to network 121 such that MME 50 can refer to the stored subscriber profile for further information regarding the subscription of the mobile device 113*a*-113*d*.

However, when a mobile device 113*a*-113*d* is attached to network 121 with a pending order or for a limited self-activation access, the GUTI attachment may cause problems. In such cases, the stored subscriber profile associated with the GUTI includes identification associated with the pending order or the limited self-activation access. Upon successful pending order release or completion of a service subscription by the mobile device 113*a*-113*d*, if the mobile device 113*a*-113*d* attempts to attach to network 121 using the GUTI associated with the pending order or limited access, for example after a power up or a reboot, the MME 50 may not retrieve a fresh copy of the subscriber profile (including any recent updates) for the mobile device from its database and simply may use a cached copy of the mobile device subscriber profile which does not include recent updates. Therefore, although the mobile device is subscribed to services provided by network 121, this GUTI attachment may identify the mobile device 113*a*-113*d* to the MME 50 as a device with a pending order or a device with a self-activation access.

Therefore, after changes in subscription or service types provided to the mobile device 113*a*-113*d* by a network 121, the subscriber profile and the GUTI associated with the subscriber profile provided to the mobile device 113*a*-113*d* by MME 50 should also be updated for the service subscription updates to be implemented. This is because the content of the subscriber profile associated with the GUTI informs MME 50 of the services to which the mobile device 113*a*-113*d* has subscribed. In order to provide an updated GUTI to a mobile device 113*a*-113*d*, the current GUTI should be removed from the mobile device 113*a*-113*d* and the mobile device 113*a*-113*d* should attach to network 121 using its IMSI. Attachment to network 121 using IMSI notifies MME 50 to retrieve a fresh copy of the mobile device subscriber profile from its subscription database HSS 52 and generate a new subscriber profile and a new GUTI for the mobile device in-line with the service subscription updates.

According to some examples, in order to provide different levels of access (e.g., limited access or full access) to a mobile device 113*a*-113*d*, the subscriber profile of the mobile device is permanently stored in HSS 52 or may be cached in MME 50. For example, a limited access may only allow a user of the mobile device to access subscription information and subscribe, by connecting to an information technology (IT) server such as, for example, the reliable activation platform 103, while a full access may include access to services and applications provided by the servers 141 via network 135 to which the mobile device is subscribed. For providing a limited access to a non-subscribed mobile device, the subscriber profile of the mobile device 113*a*-113*d* may be stored in a network element called a Self-Activation Home Subscriber Service (SA HSS), which may reside in the HSS 52 of FIG. 1. For the subscribed mobile devices, the subscriber profile may be stored in a call processing HSS, a network element of network 121.

Subsequently, a user of the mobile device 113*a*-113*d* having a limited access, as described above, may subscribe to a new service plan provided by network 121. Alternatively, a pending subscription order may already exist for the mobile device and may need to be activated on the mobile device 113*a*-113*d*. In these circumstances, the subscriber profile of the mobile device which has been previously stored in the SA HSS, for providing a limited access to the mobile device, may be deleted from the SA HSS and moved to the call processing HSS for a regular attachment of the subscribed mobile device.

As an example, upon completion of the subscription of the mobile device 113*a*-113*d* at network 121, the mobile device 113*a*-113*d* may automatically try to attach to network 121 for a regular access. Since the GUTI provided to the mobile device 113*a*-113*d* at the self-activation time is stored at the mobile device 113*a*-113*d*, the mobile device 113*a*-113*d* may perform a GUTI based attachment (per 3GPP standard). However, the MME 50 may have already deleted the subscriber profile of the mobile device 113*a*-113*d* and the GUTI from its cache, because the completion of the subscription may cause the limited access provided to the mobile device 113*a*-113*d* to be terminated and substituted with a full access, as described above. Therefore, the attachment attempt by the mobile device 113*a*-113*d* may fail and the mobile device 113*a*-113*d* may receive a response from the MME 50 indicating that the GUTI is invalid and request that the mobile device 113*a*-113*d* send its IMSI for attachment. Therefore, this GUTI attachment can cause an extra message exchange between the mobile device 113*a*-113*d* and the MME 50 which can be a waste of network resource and slow the attachment process.

In another example, due to a backend server being busy, deletion of the subscriber profile from the self-activation SA HSS may be delayed. In such cases, upon completion of the subscription of the mobile device 113*a*-113*d* at network 121, if the mobile device 113*a*-113*d* tries to attach to the network 121 for a regular access, MME 50 may re-use the self-activation profile of the mobile device 113*a*-113*d*. As a result, the mobile device 113*a*-113*d* may again be granted a limited access to the network 121 and not the full access. This limited access may not allow SIM activation and the SIM activation process may fail. The mobile device 113*a*-113*d* may not receive the full service subscribed to, until the delay is resolved and the SA HSS profile of the mobile device 113*a*-113*d* is deleted. This can cause customer dissatisfaction.

Therefore, the current existing GUTI attachment mechanism of a mobile device 113*a*-113*d* at a network 121 is disadvantageous after the mobile device 113*a*-113*d* is moved from non-subscribed/non-activated state to an activated state. The reliable activation platform 103 may provide reliable mobile device activation and may resolve the issues discussed. The reliable activation platform 103 can be a separate physical server as shown, or the reliable activation platform 103 can be implemented in software running on the same hardware platform as the server 141.

Services and applications, provided by the server 141 or server 143 to the mobile devices 113-113*d* and services provided by the reliable activation platform 103 can be configured to execute on many different types of mobile devices 113*a*-113*d*. For example, a mobile device application can be written to execute on a binary runtime environment for (BREW-based) mobile device, a Windows Mobile based mobile device, Android, I-Phone, Java Mobile, or RIM based mobile device such as a BlackBerry or the like. Some of these types of devices can employ a multi-tasking operating system.

Figure 2:
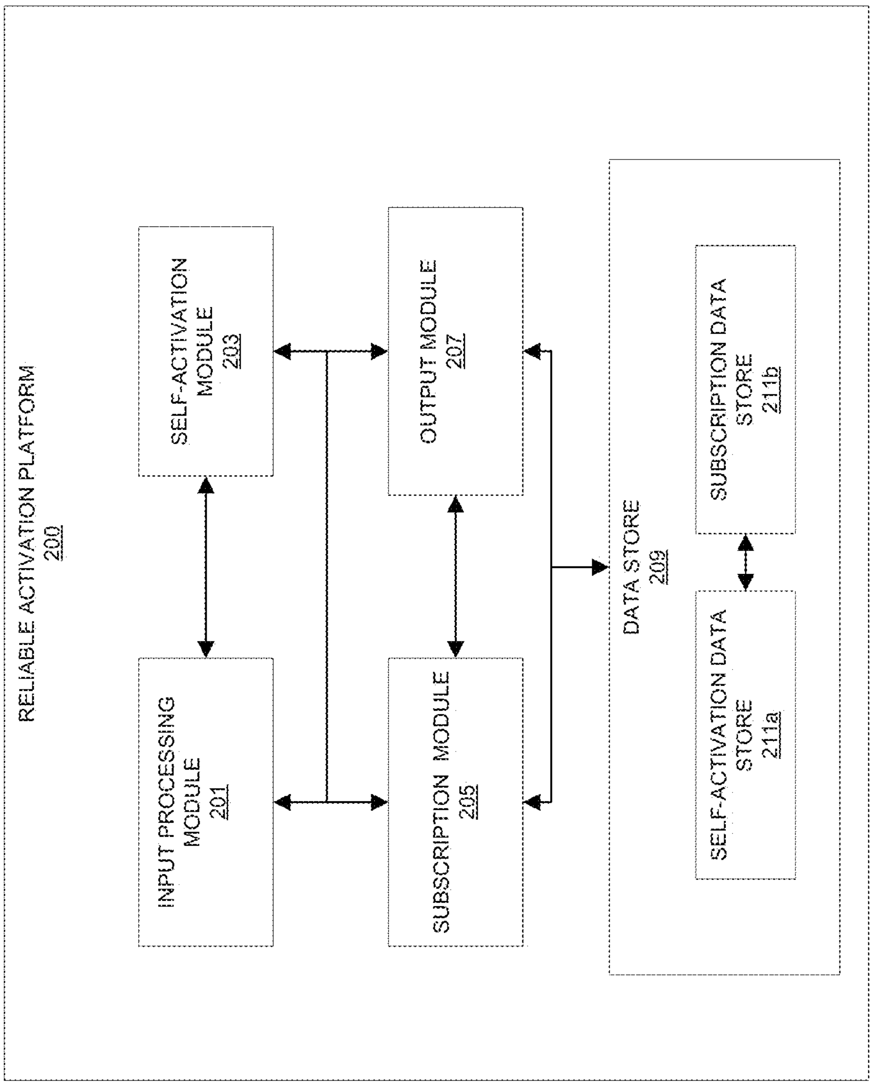
FIG. 2 is a schematic illustration of a reliable activation platform, according to an implementation.

FIG. 2 is a schematic illustration of a reliable activation platform 200, according to an implementation. The reliable activation platform 200 can be similar to the reliable activation platform 103 of FIG. 1. The reliable activation platform 200 or its components can be located anywhere within the network 121 or 135. For example, some components of the reliable activation platform 200 (e.g., subscription module 205) may be implemented at the HSS 52 of FIG. 1, and some components of the reliable activation platform 200 (e.g., self-activation module 203) may be implemented at the reliable activation platform 103 of FIG. 1. The reliable activation platform 200 can provide reliable activation for mobile devices 113*a*-113*d* for accessing the network 121. As shown in FIG. 2, the reliable activation platform 200 may include an input processing module 201, a self-activation module 203, a subscription module 205, an output module 207, and a data store 209. The data store 209 may include a self-activation data store 211*a* and a subscription data store 211*b*. In some instances, the subscription data store 211*b* may include subscription data. The subscription data may be the same data also stored in the call processing HSS. The subscription data may be the subscriber profile associated with the mobile device 113*a*-113*d*.

As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

The input processing device 201 receives a subscription request from a mobile device 113*a*-113*d* for accessing the network 121. The subscription request includes a current identifier of the mobile device 113*a*-113*d*. The subscription request may be a request for releasing a pending subscription order or creating a new subscription order for accessing the network 121. The subscription request may be sent to the activation platform 200 in response to the mobile device 113*a*-113*d* sending an attachment request to the network 121. The attachment request may include IMSI which is stored in the SIM card of the mobile device 113*a*-113*d*. IMSI is a unique identification of the mobile device 113*a*-113*d* and can be used to identify the mobile device 113*a*-113*d* to a cellular network 121.

Upon receiving the attachment request, the MME 50 at the network 121 may check the subscriber profile to determine whether the mobile device 113*a*-113*d* is authorized to access the network 121. The subscriber profile may be stored at the MME 50 internal database, the back-end billing system, or the HSS. Based on the subscriber profile and in response to the attachment request, the MME 50 may decide to grant the mobile device 113*a*-113*d* with a full access to the network 121 or a limited access depending on the subscription. The full access to the network 121 may be allowed if the subscriber profile indicates that the mobile device 113*a*-113*d* has previously subscribed to the network 121. The limited access may be granted if the mobile device 113*a*-113*d* is not subscribed to the network 121 but the mobile device 113*a*-113*d* has a self-activating status at the network 121. The self-activating status may be reflected at the SA-HSS.

Upon determining the mobile device 113*a*-113*d* has previously subscribed to the network 121, the MME 50 grants the attachment requests and provides the mobile device with the full access to the network 113*a*-113*d*. The full access to the network 121 may allow access to voice, data, and other services provided by servers at the network 121. Upon determining the mobile device 113*a*-113*d* has not previously subscribed to the network 121, the MME 50 may provide the mobile device 113*a*-113*d* with a limited access to the network. For example, the MME 50 may provide the mobile device 113*a*-113*d* with a limited access to the network upon determining the mobile device 113*a*-113*d* is capable of self-activation. The MME 50 may make this determination by checking the back-end billing system or the SA-HSS.

Upon granting the attachment request, the MME 50 may also store in its internal database the obtained subscriber profile so that the MME 50 does not have to refer back to the HSS to make a determination as to the subscription status of the mobile device. Additionally, upon granting the attachment request, the MME 50 may provide a GUTI to the mobile device 113*a*-113*d*. The GUTI is a temporary identifier assigned to the mobile device 113*a*-113*d* by MME 50, such that the mobile device 113*a*-113*d* can avoid sending its IMSI over the air (to minimize exposure of the sensitive information of the IMSI to any potential eavesdropping). When the mobile device 113*a*-113*d* communicates with network 121 using its GUTI, the MME 50 may not communicate with the HSS 52 to retrieve a most recent copy of the subscriber profile and instead may simply use a cached copy of the subscriber profile previously stored at the MME 50.

Upon determining that the mobile device 113*a*-113*d* is not subscribed to the network 121, the MME 50 may provide the mobile device 113*a*-113*d* with a limited access and the GUTI to access the activation platform 200. Accessing the activation platform may take place in several manners. In one example, the network 121 may redirect the mobile device 113*a*-113*d* to the activation platform 200. For example, the device browser may be redirected to the activation platform 200 so the user can only see the activation screens regardless of the type of content the user is attempting to view on the network 121. In another example, the client on the mobile device 113*a*-113*d* may determine there is no subscription upon receiving the limited access and GUTI (e.g., in response to the attachment request) and send a subscription request to the activation platform 200. The subscription request may be received at the input processing module 201 and may include a request for creating a new subscription order. The input processing module 201 may forward the order to the subscription module 205.

To create a new subscription order, the user may be provided with an interface to select a subscription plan and subscribing the user and the mobile device 113*a*-113*d* according to the selected subscription plan. Subscribing the user may include creating a subscription account for the user with a network owner/operator of the network 121. The subscription account may allow the user to access at least some of the features (e.g., voice calls, text messages, data access, etc.) of the network 121, and might not be a limited account.

Upon subscription of the mobile device 113*a*-113*d*, the subscription module 205 can send a notification of successful subscription to mobile device 113*a*-113*d* via the output module 207. The subscription module 205 can also provide instructions to the mobile device 113*a*-113*d* for removing the GUTI identifier (associated with the limited access) from the mobile device 113*a*-113*d*. In addition, the subscription module 205 can provide rebooting instructions to the mobile device 113*a*-113*d* via the output module 207 such that the mobile device 113*a*-113*d* can be rebooted. Upon rebooting, the mobile device 113*a*-113*d* can communicate with network 121 based on the created account using IMSI and receive an updated GUTI associated with the created account.

In another aspect, the subscription request may be a request for reactivating the mobile device 113*a*-113*d* with an updated subscription account. The user of the mobile device 113*a*-113*d* may, for example, decide to upgrade the type and level of services by addition of a new value-added service like the assignment of a static IP address, the enablement/disablement of parental controls or content filtering services, etc. Upon upgrading the subscription account at the MME 50 and the HSS 52, the reliable activation platform 200 may send an upgrade notification to the mobile device 113*a*-113*d*. The input processing module 201 may receive the upgrade notification and store the notification in data store 209. The input processing module 201 may search the data store for the upgrade notification prior to responding to the subscription request received from the mobile device 113*a*-113*d*. When it is determined by the input processing module 201 that the subscription account of the mobile device 113*a*-113*d* has been updated after the last attachment or activation of the mobile device to network 121, the input processing module 201 can send a message to the subscription module 205 regarding the updates.

The subscription module 205 can send instructions to the mobile device 113*a*-113*d*, via the output module 207, for removing the current GUTI identifier (associated with the prior subscription of the mobile device at the network) from the mobile device, rebooting the mobile device, and setting a predefined permanent identifier IMSI as a new current identifier. In this aspect, a next attempt by the user to attach to the network 121 to access services provided by network 121 via the mobile device 113*a*-113*d* will send the IMSI to network 121, allowing the mobile device 113*a*-113*d* to be provided with a new GUTI associated with the updated subscription from MME 50.

In yet another aspect, the subscription request may include a request for releasing pending subscription order for the mobile device 113*a*-113*d* to the network 121. For example, a user may have ordered a mobile device 113*a*-113*d* online. At the time of online order, a subscription order for the mobile device 113*a*-113*d* may be sent to the reliable activation platform 200. The subscription order may be stored in data store 209. In such cases, as previously discussed, the MME 50 can determine that the mobile device 113*a*-113*d* is self-activation capable and provided a limited access and GUTI to the mobile device 113*a*-113*d* until the mobile device 113*a*-113*d* is subscribed to the network 121. Upon receiving the limited access and the GUTI, the mobile device 113*a*-113*d* may send a subscription request to the activation platform 200. The activation platform 200 receives the subscription request and determines there is a pending subscription order. To release the pending subscription order, the activation platform 200 may provide the user with an interface displaying previously ordered subscription and option or an instruction to modify and release the order. The activation platform 200 may then send the order to the network (e.g., HSS 52) to create a subscriber profile for the mobile device 113*a*-113*d*.

The activation platform 200 may also send a notification of successful subscription to the mobile device 113*a*-113*d*. The notification may include instructions to the mobile device 113*a*-113*d* for removing the temporary GUTI identifier, provided by MME 50 to the mobile device 113*a*-113*d* and instructions for rebooting the mobile device 113*a*-113*d*. Upon rebooting, the predefined permanent identifier IMSI is set as a new current identifier by the mobile device 113*a*-113*d*. In this aspect, a next attempt by the user to attach to network 121, via the mobile device 113*a*-113*d* will send the IMSI to MME 50 and MME 50 can provide a new GUTI associated with the subscription to the mobile device 113*a*-113*d*.

Figure 3A:
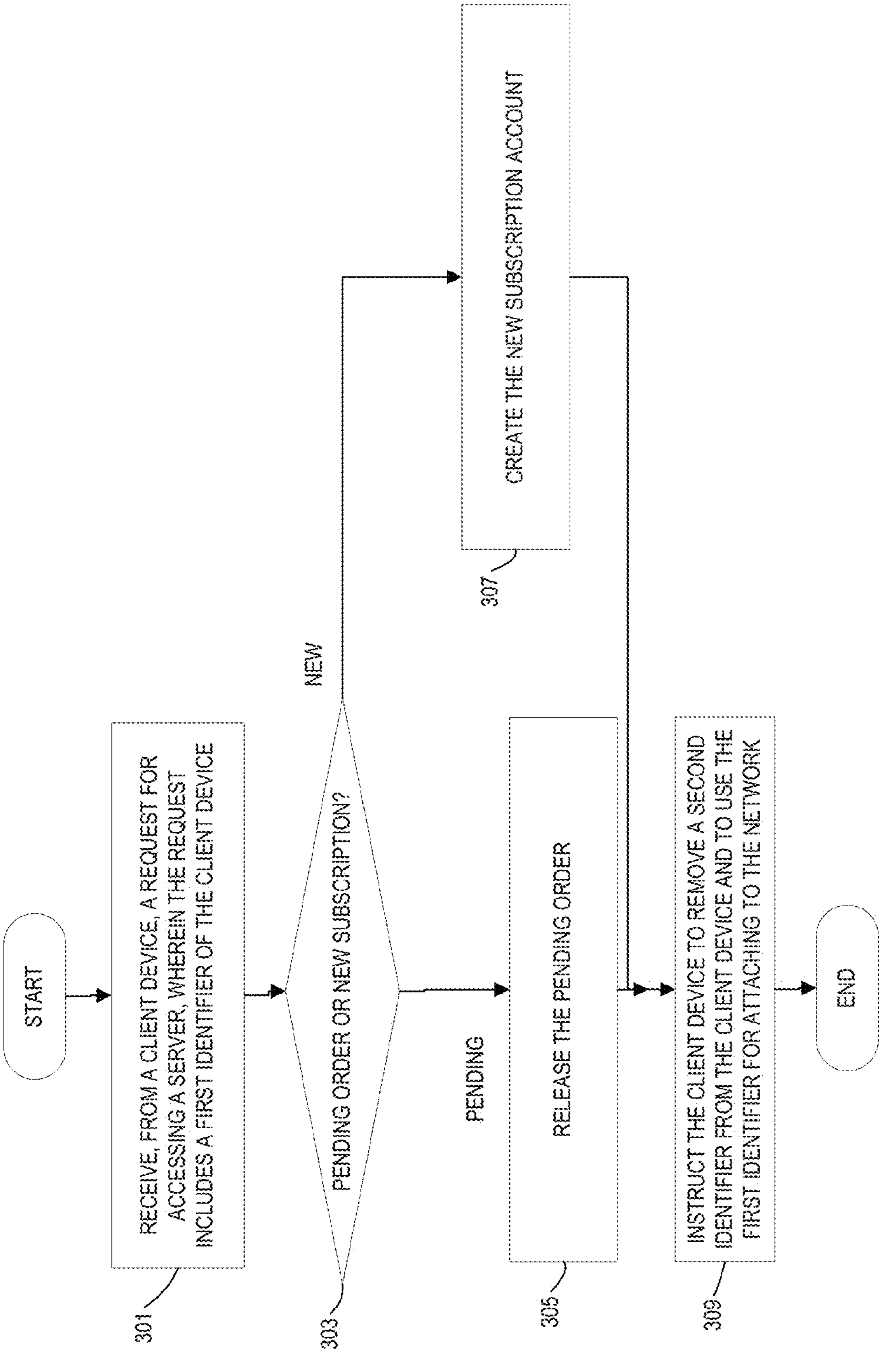
FIGS. 3A-3B are exemplary processes for providing reliable activation for mobile devices.
Figure 3B:
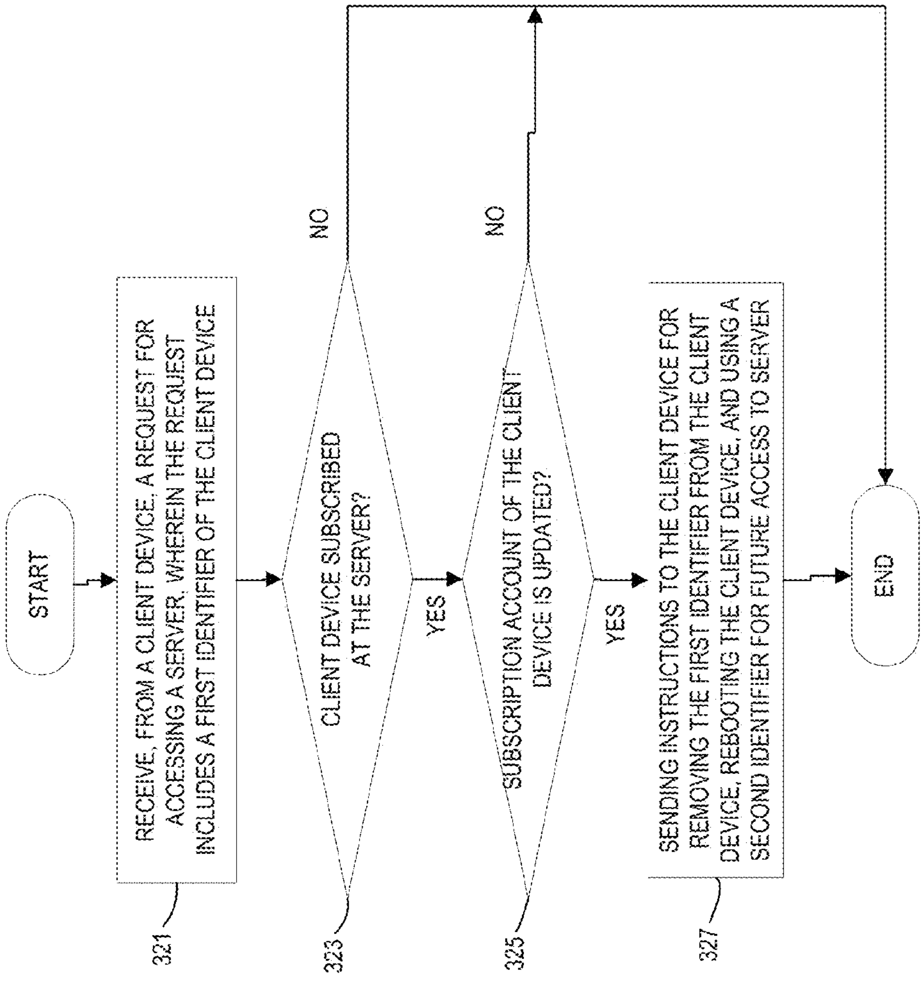

FIGS. 3A-3B are exemplary processes for providing reliable activation for mobile devices. Although FIGS. 3A-3B are described with reference to FIGS. 1 and 2, the subject technology is not limited to such and can apply to other computing devices and systems.

FIG. 3A is an exemplary process for reliable activation of a mobile device at a server for the first time. At block 301, the reliable activation platform 200 may receive subscription request from the mobile device 113*a*-113*d*, for accessing network 121. The request may arrive after the client device is provided with a limited network access by the MME to complete its network subscription. The request may include an identifier of the client device 113*a*-113*d*. The identifier may include IMSI associated with the client device.

At block 303, using the provided identifier, the reliable activation platform 200 checks whether a pending order exists or a new subscription account needs to be created without a pending order. The activation platform 200 informs the mobile device 113*a*-113*d* of whether a pending order exists or a new subscription account needs to be created. If the pending order exists and if instructed by the mobile device 113*a*-113*d*, at block 305, the reliable activation platform 200 releases the pending order previously created for subscription of the mobile device 113*a*-113*d* at network 121. Otherwise if instructed by the mobile device 113*a*-113*d*, at block 307, the reliable activation platform 200 creates a new subscription account.

In a slightly different implementation, upon receiving the limited access, the mobile device 113*a*-113*d* asks the activation platform 200 whether a pending subscription exists for the mobile device 113*a*-113*d*. If so, the mobile device 113*a*-113*d* may instruct the activation platform 200 to release the pending order. If there is no pending order, the mobile device 113*a*-113*d* may ask if the subscriber wants to sign up for service. If the subscribers wants to sign up for service, the mobile device 113*a*-113*d* may open a browser window to the activation platform 200, which may the display subscription options for the mobile device 113*a*-113*d*. By selecting a specific subscription plan user may be subscribed to the network. Subscribing the user may include creating a subscription account for the user with a network owner/operator of the network 121. The subscription account may allow the user to access at least some of the features (e.g., voice calls, text messages, data access, etc.) of the network 121, and might not be a limited account.

Upon subscription of the mobile device 113*a*-113*d*, the subscription module 205 can send a notification of successful subscription to mobile device 113*a*-113*d* via the output module 207. The subscription module 205 can also provide instructions to the mobile device 113*a*-113*d* for removing the GUTI identifier (provided to the mobile device with the limited access) from the mobile device 113*a*-113*d*. In addition, the subscription module 205 can provide rebooting instructions to the mobile device 113*a*-113*d* via the output module 207 such that the mobile device 113*a*-113*d* can be rebooted. Upon rebooting, the mobile device 113*a*-113*d* can communicate with network 121 based on the created account using IMSI and receive an updated GUTI associated with the created account.

The GUTI identifier may be removed because it is associated with the subscriber profile of the limited account and if the GUTI identifier remains in the local memory of the mobile device an attempt by the mobile device to access the network 121 may cause the MME 50 to provide a limited account to the mobile device while the mobile device is subscribed and activated, and should be provided with a full access of the subscribed and activated mobile device.

It is noted that subsequent to subscription or activation of the mobile device 113*a*-113*d*, the first attempt by the mobile device 113*a*-113*d* to attach to network 121 can cause the mobile device to send its permanent identifier (e.g., IMSI) to the network. In such case, the server component MME 50 may retrieve a fresh copy of the subscriber profile from subscription data store HSS which may indicate that the mobile device 113*a*-113*d* has a full access to network 121. This allows the mobile device 113*a*-113*d* to proceed with using services provided by the network 121. This reduces a number of messages exchanged between the MME 50 and the mobile device 113*a*-113*d*, and prevents the mobile device 113*a*-113*d* from being stuck in the limited access state provided by the limited account. At block 309 the subscription module 205 instructs the mobile device 113*a*-113*d* to remove the GUTI from the mobile device 113*a*-113*d* and to use the IMSI for attaching to the network 121.

FIG. 3B is an exemplary process for reliable activation of a mobile device 113*a*-113*d* that is previously subscribed at a network but is accessing the network for the first time after its subscription at the network has been updated. At block 321, the input processing module 201 receives a subscription request from the mobile device 113*a*-113*d*. The subscription request may include an identifier of the client device 113*a*-113*d* (e.g., IMSI).

At block 323, the input processing module 201 determines, based on the identifier and based on information associated with subscribed mobile devices (for example in subscription data store 211*b*), whether the mobile device 113*a*-113*d* is previously subscribed at network 121. For example, the input processing module 201 may search a subscription data store for a subscriber profile of the mobile device 113*a*-113*d*. When it is determined, by the input processing module 201, that the mobile device 113*a*-113*d* is not subscribed at network 121 (block 323, no), the process of FIG. 3B may end. Alternatively, the process may continue at block 307 of FIG. 3A.

When it is determined, at block 323, that the mobile device 113*a*-113*d* is subscribed at network 121 (block 323, yes), at block 325 the input processing module 201 checks whether the subscribed account of the mobile device 113*a*-113*d* is updated prior to receiving the subscription request from the mobile device. Upon an update in the subscription account of the mobile device 113*a*-113*d*, the HSS 52 may send a notification to the input processing module 201 indicating a date and time of the update. For example, a user of the mobile device 113*a*-113*d* may have upgraded the subscription account to add a parental control service. Alternatively, the input processing module 201 may make this determination based on information in the subscriber profile of the mobile device 113*a*-113*d*, an update log of the subscriber profile, an access log to the MME 50 or the HSS 52, etc. For example, the input processing module 201 can compare a date and time of the latest subscription account update for the mobile device 113*a*-113*d* and the subscription request received from the mobile device 113*a*-113*d* and when the difference between the time and/or date of the two events is less than a predetermined threshold, determine that the subscription account has been updated and the latest request needs to be processed based on the updated subscription information.

When it is determined that the subscription account is not updated (block 325, no), the process of FIG. 3B may end. When it is determined that the subscription account is updated (block 325, yes), the input processing module 201 can notify the subscription module 205 and at block 327 the output module 207 can send instructions to the mobile device 113*a*-113*d* for removing a current identifier stored in local memory of the mobile device. For example, the current identifier may be a GUTI provided to the mobile device 113*a*-113*d* at the time of subscription of the mobile device at network 121 prior to the subscription updates. If the current identifier is not removed from the local memory of the mobile device, a request to attach to network 121 by the mobile device can cause the network to provide access to the mobile device based on an old subscription prior to the updates. The instructions sent to the mobile device 113*a*-113*d* by the output module 207 may also include instructions for rebooting the mobile device and setting a predefined permanent identifier (e.g., IMSI) as the identifier. This is because, as long as the mobile device 113*a*-113*d* is identified by a GUTI, the service provided by attachment to network 121 to the mobile device will remain the service associated with the GUTI. Setting the identifier to IMSI informs the reliable activation platform 200 of a change in the subscription and causes the MME 50 to generate a new GUTI for the mobile device based on the updates.

Figure 4A:
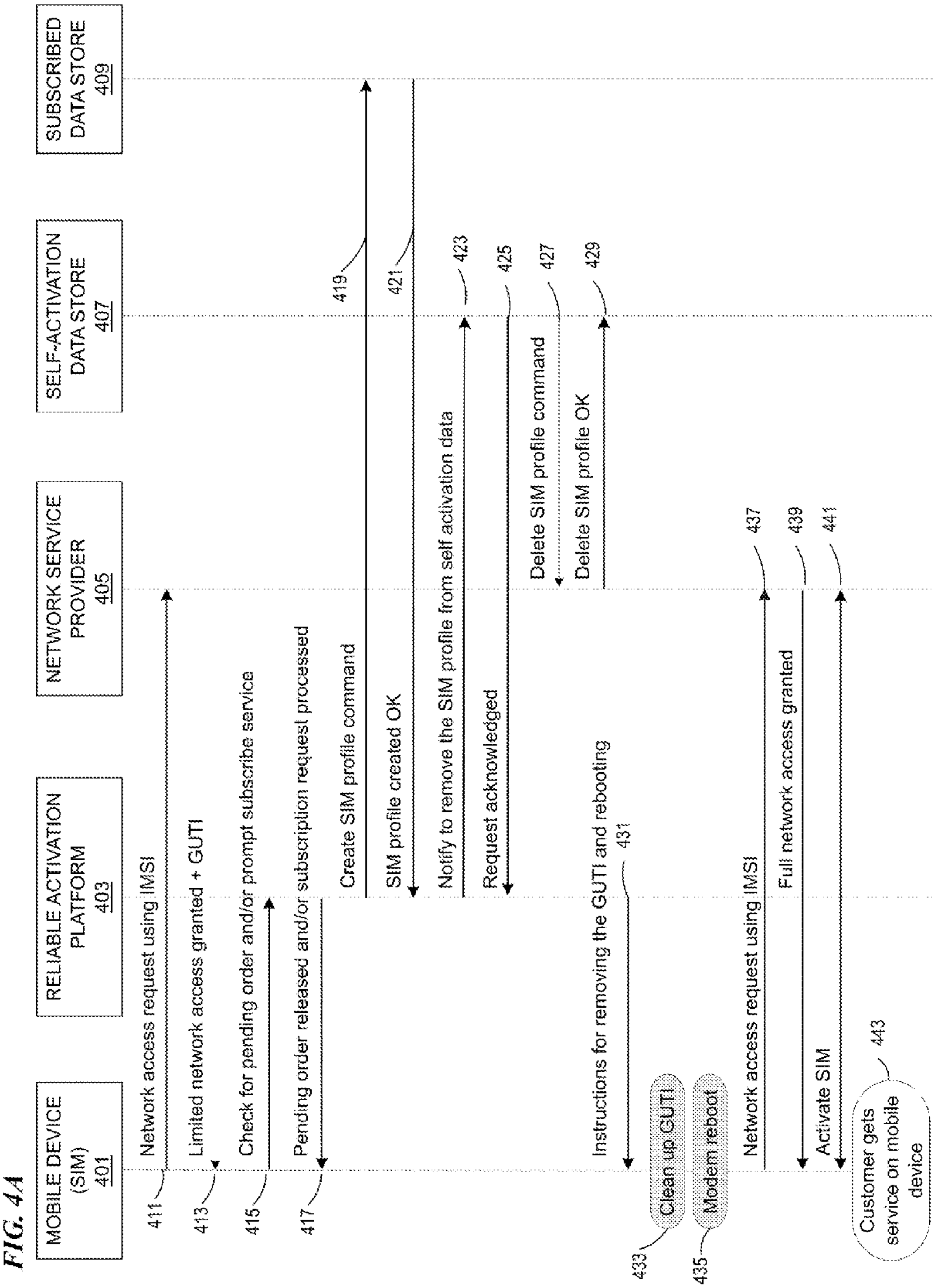
FIGS. 4A-4B are exemplary process flows of communication requests processed by the reliable activation platform shown in FIG. 2.
Figure 4B:
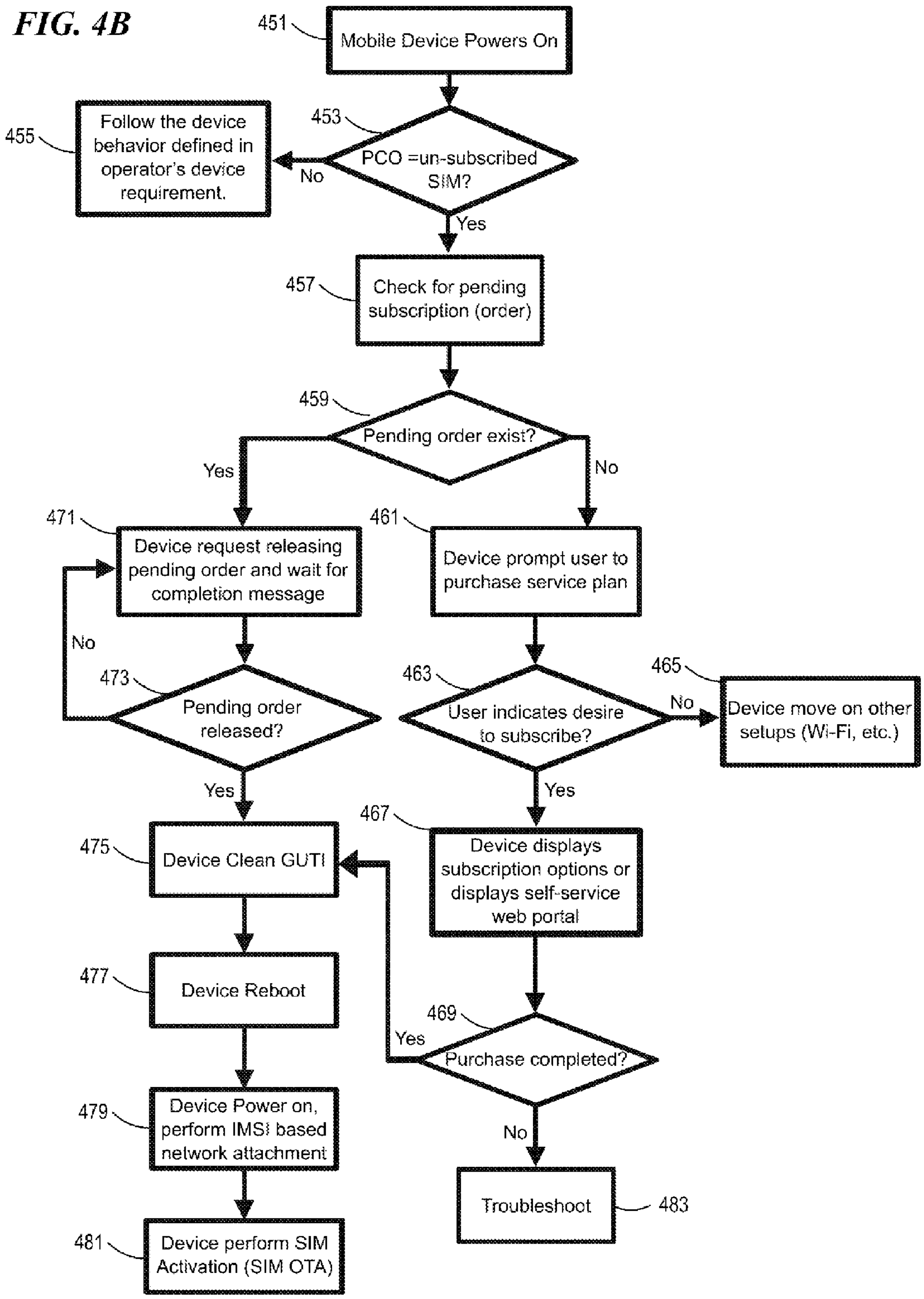

FIGS. 4A-4B are exemplary process flows of communication requests processed by the reliable activation platform shown in FIG. 2. FIG. 4A is a process of self-activation of a mobile device 401, similar to a mobile device 113*a*-113*d* of FIG. 1. The reliable activation platform 403 is similar to the reliable activation platform 200 of FIG. 2 or the reliable activation platform 103 of FIG. 1. The network service provider 405 may be implemented via the network 121 of FIG. 1. The self-activation data store 407 is similar to the self-activation data store 211*a* of FIG. 2, and may be implemented using a SA HSS, residing within the HSS 52 of FIG. 1. The subscribed data store 409 is similar to the subscription data store 211*b* of FIG. 2, and may be implemented using the HSS 52 of FIG. 1.

The mobile device 401 is equipped with a SIM card which is initially not connected to a subscription account or a subscription at a network service provider 405. For example, a user may purchase the mobile device 401 from a store (or a vending machine) without activating the mobile device at the store. The user may power up the mobile device 401. Upon the power up at step 411, the SIM card sends an attachment request to the network service provider 405. The attachment request may be sent immediately upon the power up. Alternatively, the attachment request may be sent when the user attempts to connect to the network, for example, by opening a web browser, or selecting the network from a list of available networks, which may include one or more cellular or WiFi networks. The attachment request may include the IMSI associated with the mobile device. The IMSI may be sent for identification of the mobile device to the service provider 405, since the mobile device 401 has no prior history attaching to network service provider 405.

At step 413 the network service provider 405 grants a limited network access to mobile device 401, as discussed in FIGS. 2 and 3A. The limited network access may provide an interface for the purpose of setting up a subscription account for the mobile device 401, but might, in some cases, not provide an interface for other network functions, such as placing non-emergency voice calls, sending text messages, or accessing data through the network. Upon granting the limited network access, the network service provider 405 sends a GUTI associated with the limited access account to the mobile device 401. The network service provider 405 may also send a notification to the mobile device 401 indicating that a limited access is granted but the mobile device is not subscribed at the server and needs to subscribe. For example, the notification may be sent to the mobile device 401 from the network service provider 405 in the form of a PCO container.

At step 415, the mobile device 401 can check for a pending order for subscription at network service provider 405, for example, by communicating with the input processing module 201, and having the input processing module 201 search a billing database (or other data structure) for determining whether the pending order is stored. The communication between the mobile device 401 and the reliable activation platform 403 or the network service provider 405 can be via a client component (e.g., a script) on mobile device 401 that may recognize that there is no subscription and display a subscription screen on a user interface of the mobile device 401. Alternatively, the user of the mobile device 401 may open a browser and the browser is redirected to the reliable activation platform 403 such that the user can access activation screens regardless of what they are trying to view on the network. The limited account allows the mobile device 401 to check for a pending order or subscription service associated with the mobile device 401. For example, the user may have set up a subscription account on-line and have received the mobile device 401 associated with the subscription account by mail. The mobile device 401 may directly send a request for checking the pending order to the reliable activation platform 403, as shown in FIG. 4A and an instruction for releasing the pending subscription order. Alternatively, the network service provider 405 may receive the request from the mobile device 401 and redirect the request to the reliable activation platform 403 (redirection not shown).

At step 417, the reliable activation platform 403 processes the subscription request and releases the pending subscription order based on the instruction received from the mobile device, if a pending subscription order exists, as discussed with regards to FIG. 3A. If a pending subscription order does not exist, the subscription module 205 of the reliable activation module 403 may direct the mobile device 401 to a web site where the user may sign up for a subscribed account. Alternatively, the reliable activation module 403 may offer subscription options directly to the user of the mobile device 401. The user may input required subscription information at the website and the mobile device 401 may become associated with a newly created subscription account at the network service provider 405.

During the subscription, at step 419, the reliable activation platform 403 may store a subscriber profile of the mobile device 401 in a subscribed data store 409 (e.g., HSS 52) and receive a notification from the subscribed data store 409, at step 421, indicating that the subscriber profile was successfully created. A create subscriber profile command may be provided from the reliable activation platform 403 to the subscribed data store 409. At step 423, the reliable activation platform 403 removes the subscriber profile of the mobile device 401 from the self-activation data store 407. The self-activation data store 407 may be equipped with a processor (not shown) for removing the subscriber profile. In this case, the reliable activation platform 403 may notify the processor associated with the self-activation data store 407 (e.g., SA HSS) to remove the subscriber profile of the mobile device 401 from the self-activation data store 407 and receive an acknowledgement from the processor at step 425. The self-activation data store 407 may then send the request for removing the self-activation subscriber profile to the network service provider 405 in step 427 and receive a notification of a successful removal of the subscriber profile from the network service provider 405 in step 429.

At step 431, the reliable activation platform 403 sends instructions to mobile device 401 for removing the GUTI associated with the limited access and, optionally, rebooting the mobile device 401. For example, the user may see a notification stating that subscription is completed, the device may reset and the user may attach to the network service provider 405 after reset. At steps, 433 and 435 the mobile device 401 respectively removes the GUTI from its local memory and reboots based on the instructions received from the reliable activation platform 403. In some cases, the modem reboot of step 435 may not be required. Upon rebooting or after removing the GUTI from the local memory, at step 437, the mobile device 401 may attempt to attach to the network service provider 405. However, since the GUTI has been removed from the mobile device's local memory, the mobile device 401 sends its IMSI to the network service provider 405 with the attachment request.

At step 439, the network service provider 405 grants a full access to the mobile device 401 based on the subscription performed in step 419 and in step 441 the SIM card of the mobile device 401 is activated. The MME 50 may store that a subscription has been created for the mobile device, and may allow the mobile device to access the network and to activate the SIM card based on the subscription. The user can start using the provided services as shown at step 443. In some implementations, the network service provider 405 also sends a new GUTI to the mobile device 401 for further attachment, so that the mobile device 401 does not need to provide its IMSI for attachment in the future.

FIG. 4B is a flowchart of the process of self-activation of a mobile device 401 of FIG. 4A. At block 451 the user powers up the mobile device 401. Upon the power up, the SIM card sends an attachment request to the network service provider 405. The network service provider may receive and process the attachment request at the MME 50. The attachment request may include the IMSI associated with the mobile device. The IMSI may be sent for identification of the mobile device to the service provider 405, since the mobile device 401 has no prior history attachment to the network service provider 405.

At block 453 the mobile device 401 checks a PCO value associated with a subscription status of the mobile device 401. The PCO value may be sent to the mobile device 401. The PCO value may also be stored in a billing database, at the HSS 52 or at the reliable activation platform 103. If the PCO value indicates that the device is subscribed (block 453, no), in block 455, the mobile device 401 accesses services provided to the mobile device 401 by the network service provider 405 based on the subscriber profile of the mobile device. If the PCO value indicates that the device is un-subscribed (block 453, yes), at block 457, the mobile device 401 requests the reliable activation platform 403 to check for any pending order or subscription service associated with the mobile device 401.

At block 459, it is determined whether a pending subscription order exists for the mobile device, based on the request of block 457. If a pending subscription order exists for the mobile device (block 459, yes), the process continues at block 471, where the mobile device 401 is subscribed to the network service provider 405, per the pending subscription order, and the pending order is released. The mobile device 401 may wait for a message indicating completion of the release from the reliable activation platform 403, as shown at block 473. The message may also include instructions for removing the GUTI from the mobile device 401 and rebooting the mobile device. If the message indicates that the pending order is released (block 473, yes), at block 475, the mobile device 401 removes the GUTI from the local memory of the mobile device 401. At step 477 the mobile device 401 reboots, based on instructions received at the mobile device from the MME 50. However, if the message indicates that the pending order is not released (block 473, no), at block 471 the subscription process may be repeated until the pending order is released.

Upon rebooting, at block 479, the mobile device 401 powers up and attempts to attach to network service provider 405 using IMSI. At block 481, the network service provider 405 grants a full access to the mobile device 401 and provides a GUTI identifier to the mobile device 401, based on the subscription, such that the mobile device 401 may present the provided GUTI, instead of its IMSI, for future attachment requests to the network.

If a pending order does not exist (block 459, no), at block 461, the mobile device 401 prompts the user with a message to select a service plan. The message may be sent to the mobile device 401 from the network service provider 405. One or more available service plans may be presented to the user for selection, for example, on the screen of the mobile device 401 or in a window of a web browser of the mobile device 401. Upon indication of desire to subscribe by the subscriber (block 463, yes), the mobile device will display the appropriate subscription options or will connect to the network provider self-service web portal to display these options, at block 467. Upon completion of the subscription via the web portal, (block 469, yes), the process continues from block 475 with removal of the GUTI from the mobile device as previously discussed. If any issues arise during the process and at block 469 it is determined that the process is not complete (block 469, no), at block 483 the reliable activation platform 200, the reliable activation platform 54 103 may start a troubleshooting process for fixing the issue. The troubleshooting process may include repeating one or more of the above-listed steps or instructing the user to select a service plan in another manner, for example, by visiting a brick-and-mortar store associated with the service provider or telephoning a customer service number.

Alternatively, at block 463, the user may refuse to subscribe the device, (block 463, no). In this case, at block 465 the mobile device 401 may provide services based on other setups to the user, such as a Wi-Fi service.

Figure 5:
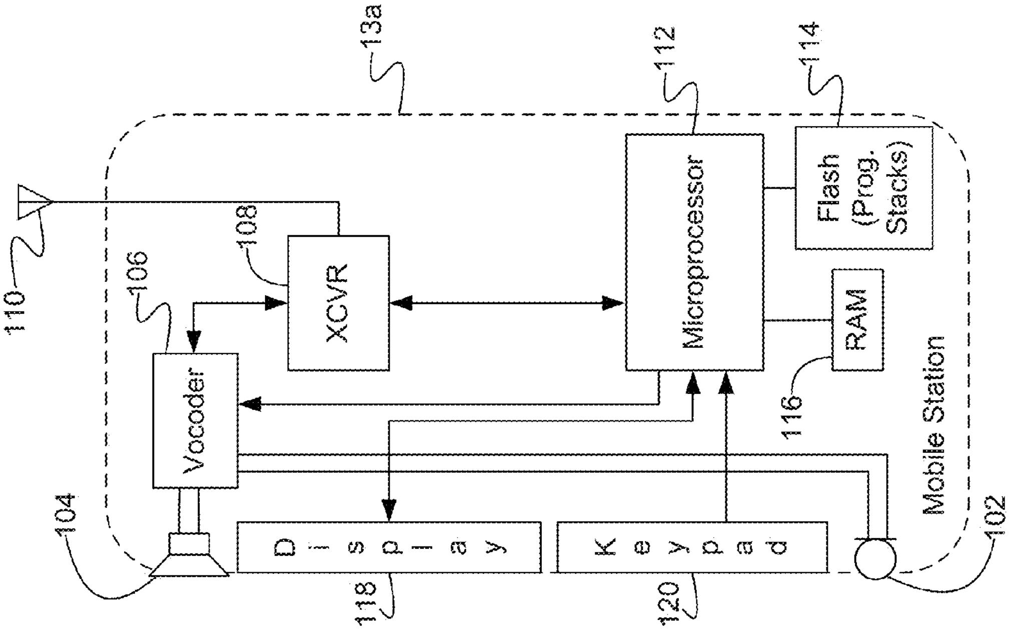
FIG. 5 is a high-level functional block diagram of an exemplary non-touch type mobile device that may utilize the reliable activation service through a network/system like that shown in FIG. 1.

For purposes of such a discussion, FIG. 5 is a high-level functional block diagram of an exemplary non-touch type mobile device that may utilize the reliable activation and attachment service through a network/system like that shown in FIG. 1.

FIG. 5 provides a block diagram illustration of an exemplary non-touch type mobile device 113*a*. Although the mobile device 113*a* may be a smart-phone or may be incorporated into another device, such as a personal digital assistant (PDA) or the like, for discussion purposes, the illustration shows the mobile device 113*a* is in the form of a handset. The handset implementation of the mobile device 113*a* functions as a normal digital wireless telephone station. For that function, the station 113*a* includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 113*a* also includes at least one digital transceiver (XCVR) 108. Today, the handset 113*a* would be configured for digital wireless communications using one or more of the common network technology types. The concepts discussed here encompass implementations of the mobile device 113*a* utilizing any digital transceivers that conform to current or future developed digital wireless communication standards. The mobile device 113*a* may also be capable of analog operation via a legacy network technology.

The transceiver 108 provides two-way wireless communication of information, such as vocoded speech samples and/or digital information, in accordance with the technology of the network 121. The transceiver 108 also sends and receives a variety of signaling messages in support of the various voice and data services provided via the mobile device 113*a* and the communication network. Each transceiver 108 connects through radio frequency (RF) send and receive amplifiers (not separately shown) to an antenna 110. The transceiver may also support various types of mobile messaging services, such as short message service (SMS), enhanced messaging service (EMS) and/or multimedia messaging service (MMS).

The mobile device 113*a* includes a display 118 for displaying messages, menus or the like; call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during reliable activation and attachment process. For example, if used for reliable activation and attachment provided by a reliable activation platform 200 or requesting the reliable activation and attachment service to mobile devices.

A microprocessor 112 serves as a programmable controller for the mobile device 113*a*, in that it controls all operations of the mobile device 113*a* in accord with programming that it executes, for all normal operations, and for operations involved in the reliable activation and attachment procedure under consideration here. In the example, the mobile device 113*a* includes flash type program memory 114, for storage of various "software" or "firmware" program routines and mobile configuration settings, such as mobile directory number (MDN) and/or mobile identification number (MIN), etc. The mobile device 113*a* may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile device 113*a* includes a processor, and programming stored in the flash memory 114 configures the processor so that the mobile device is capable of performing various desired functions, including in this case the functions involved in the technique for providing reliable activation and attachment services. For example, any of the modules of the reliable activation platform 200 or any parts of the modules can be located on the mobile device 113*a*.

Figure 6:
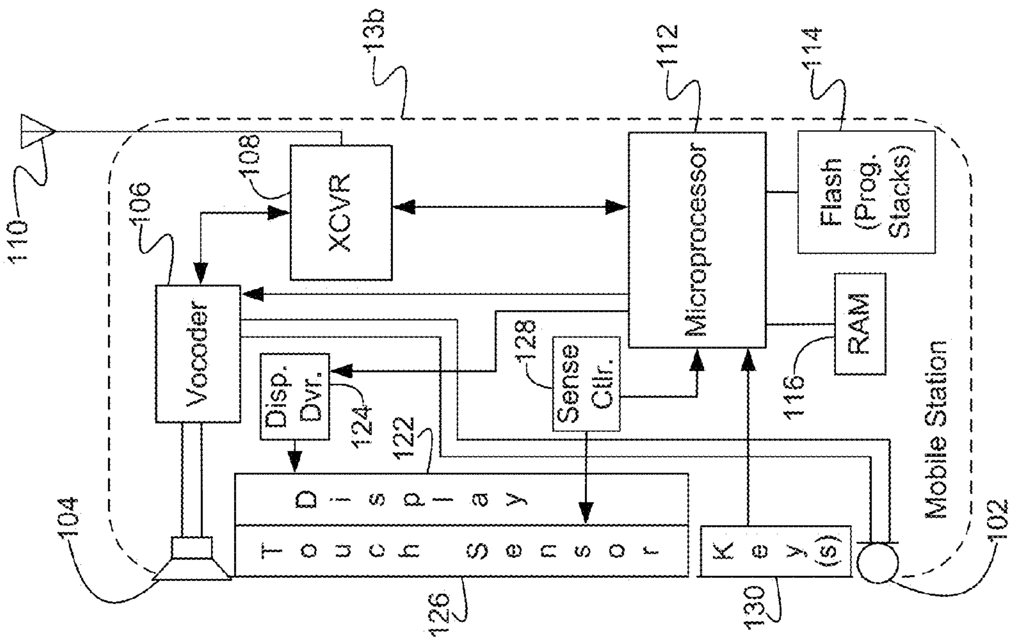
FIG. 6 is a high-level functional block diagram of an exemplary touch screen type mobile device that may utilize the reliable activation service through a network/system like that shown in FIG. 1.

For purposes of such a discussion, FIG. 6 provides a high-level functional block diagram of an exemplary touch screen type mobile device that may utilize the reliable activation and attachment service through a network/system like that shown in FIG. 1. FIG. 6 provides a block diagram illustration of an exemplary touch screen type mobile device 113*b*. Although possible configured somewhat differently, at least logically, a number of the elements of the exemplary touch screen type mobile device 113*b* are similar to the elements of mobile device 113*a*, and are identified by like reference numbers in FIG. 6. For example, the touch screen type mobile device 113*b* includes a microphone 102, speaker 104 and vocoder 106, for audio input and output functions, much like in the earlier example. The mobile device 113*b* also includes at least one digital transceiver (XCVR) 108, for digital wireless communications, although the handset 113*b* may include an additional digital or analog transceiver.

The concepts discussed here encompass implementations of the mobile device 113*b* utilizing any digital transceivers that conform to current or future developed digital wireless communication standards. As in the station 113*a*, the transceiver 108 provides two-way wireless communication of information, such as vocoded speech samples and/or digital information, in accordance with the technology of the network 121. The transceiver 108 also sends and receives a variety of signaling messages in support of the various voice and data services provided via the mobile device 113*b* and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 113*a*, a microprocessor 112 serves as a programmable controller for the mobile device 113*b*, in that it controls all operations of the mobile device 113*b* in accord with programming that it executes, for all normal operations, and for operations involved in the reliable activation and attachment procedure under consideration here. In the example, the mobile device 113*b* includes flash type program memory 114, for storage of various program routines and mobile configuration settings. The mobile device 113*b* may also include a non-volatile random access memory (RAM) 116 for a working data processing memory. Of course, other storage devices or configurations may be added to or substituted for those in the example. Hence, outlined above, the mobile device 113*b* includes a processor, and programming stored in the flash memory 114 configures the processor so that the mobile device is capable of performing various desired functions, including in this case the functions involved in the technique for providing reliable activation and attachment service.

In the example of FIG. 5, the user interface elements include a display and a keypad. The mobile device 113*b* may have a limited number of key 130, but the user interface functions of the display and keypad are replaced by a touch screen display arrangement. At a high level, a touch screen display is a device that displays information to a user and can detect occurrence and location of a touch on the area of the display. The touch may be an actual touch of the display device with a finger, stylus or other object, although at least some touch screens can also sense when the object is in close proximity to the screen. Use of a touch screen display as part of the user interface allows a user to interact directly with the information presented on the display.

Hence, the exemplary mobile device 113*b* includes a display 122, which the microprocessor 112 controls via a display driver 124, to present visible outputs to the device user. The mobile device 113*b* also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile device 113*b*. The microphone 102 and speaker 104 may be used as additional user interface elements, for audio input and output, including with respect to some reliable activation and attachment related functions.

The structure and operation of the mobile devices 113*b*, as outlined above, were described by way of example, only. As shown by the above discussion, functions relating to the reliable activation and attachment service, via a graphical user interface of a mobile device may be implemented on computers connected for data communication via the components of a packet data network, operating as shown in FIG. 1. Although special purpose devices may be used, such devices also may be implemented using one or more hardware platforms intended to represent a general class of data processing device commonly used to run "server" programming so as to implement the reliable activation and attachment functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for reliable activation and attachment service. The software code is executable by the general-purpose computer that functions as the reliable activation platform and/or that functions as a user terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for reliable activation and attachment service, in essentially the manner performed in the implementations discussed and illustrated herein.

Figure 7:
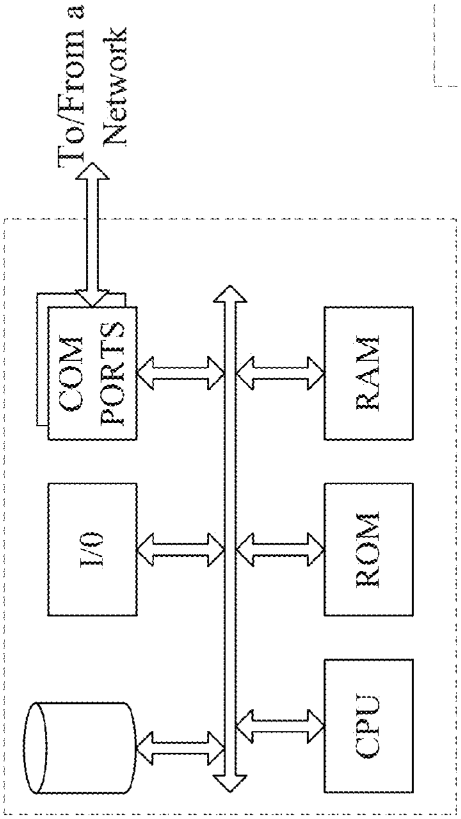
FIG. 7 is a simplified functional block diagram of an exemplary computer that may be configured as a host or server.
Figure 8:
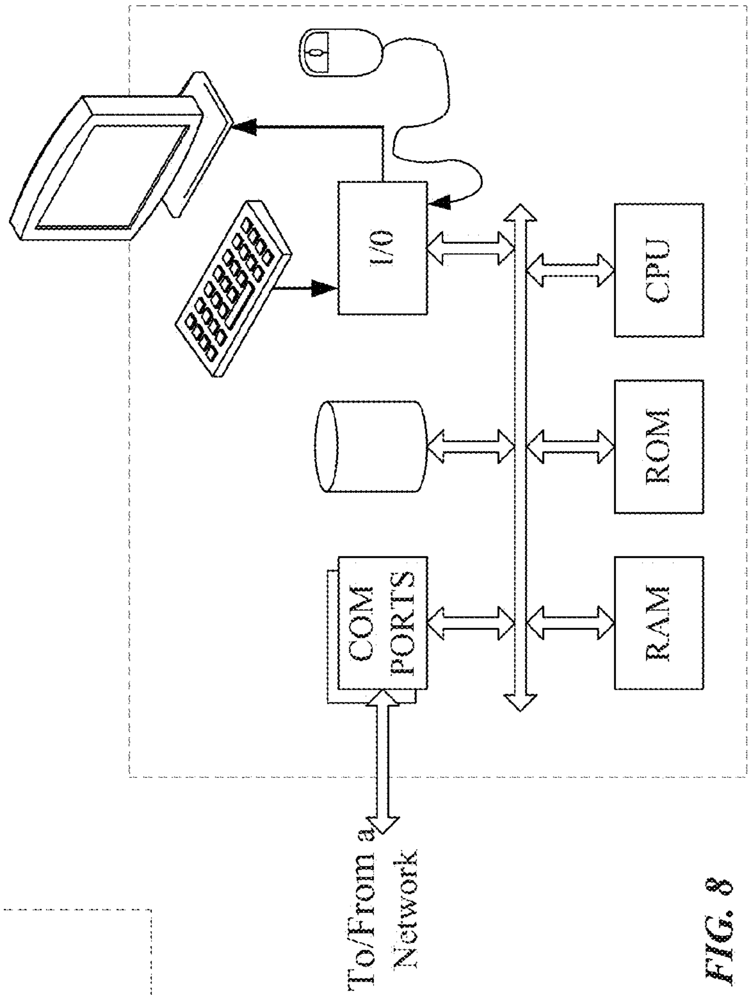
FIG. 8 is a simplified functional block diagram of an exemplary personal computer or terminal device.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 7). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of providing reliable activation and attachment services outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the reliable activation platform 200 into the MME 50, the HSS 52 or the reliable activation platform 103 that will be the application server for the mobile devices 113*a*-113*d*. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, that may be used to implement the reliable activation and attachment service, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. For example, in some aspects a GUTI may be referred to as a first identifier and an IMSI as a second identifier, while in other aspects an IMSI may be referred to as a first identifier and a GUTI as a second identifier. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A method comprising:

receiving, from a client device and at an activation server, a subscription request for accessing a network, wherein the subscription request includes a first identifier of the client device;

determining, at the activation server and based on the first identifier, whether a pending order for a subscription account exists;

upon determining at the activation server that a pending order for a subscription account does not exist, determining that a new subscription account is to be created;

upon determining at the activation server that the pending order exists, releasing the pending order; and upon determining at the activation server that the new subscription account is to be created, creating the new subscription account, and instructing the client device to replace a second identifier used for attaching to the network with the first identifier and use the first identifier to attach to the network.

2. The method of claim 1, further comprising:

upon determining at the activation server that the subscription request includes the instruction for creating the new subscription account, providing, to the client device, an interface for selecting the new subscription account.

3. The method of claim 2, wherein the interface for selecting the new subscription account includes a limited network access limiting access to one or more of non-emergency voice calls, text messages, or network data access.

4. The method of claim 1, wherein the second identifier is a Globally Unique Temporary Identifier (GUTI), and the first identifier is an International Mobile Subscriber Identifier (IMSI).

5. The method of claim 1, further comprising:

providing, from the activation server to a subscribed data store, instructions for creating a subscriber profile for the client device; and notifying, via the activation server, a self-activation data store to remove the subscriber profile from the self-activation data store.

6. The method of claim 5, wherein determining that the pending order exists or the new subscription account is to be created comprises accessing, via the activation server, the self-activation data store.

7. The method of claim 1, further comprising:

upon use, by the client device, of the first identifier for attaching to the network, providing, to the client device, a third identifier for attaching to the network.

8. The method of claim 7, wherein the third identifier is a Globally Unique Temporary Identifier (GUTI), and wherein the third identifier is different from the second identifier.

9. The method of claim 1, further comprising:

instructing the client device to remove the second identifier and to reboot after removing the second identifier.

10. A method comprising:

sending, from a mobile device to a network, an attachment request including a first identifier;

in response to the attachment request, receiving from the network a second identifier and a limited access to the network for subscribing to the network;

storing the second identifier at the mobile device and sending a subscription request to the network using the first identifier and the limited access to the network;

in response to sending the subscription request and subsequent to being subscribed to the network, receiving from the network an instruction for removing the second identifier from the mobile device; and in response to the received instruction, removing the second identifier from the mobile device and sending an attachment request to the network using the first identifier.

11. The method of claim 10, further comprising:

receiving, from the network and in response to the attachment request using the first identifier, a third identifier for the mobile device.

12. The method of claim 11, further comprising:

using, at the mobile device, the third identifier for subsequent connection or attachment to the network.

13. The method of claim 12, wherein the third identifier is used to avoid transmitting the first identifier over the network.

14. The method of claim 11, wherein:

the first identifier is an International Mobile Subscriber Identifier (IMSI), the second identifier is a first Globally Unique Temporary Identifier (GUTI), and the third identifier is a second GUTI.

15. An activation server comprising:

a processor; and a memory comprising instructions which, when executed by the processor, cause the processor to:

receive, from a client device, a subscription request for accessing a network, wherein the subscription request includes a first identifier of the client device;

determine, based on the first identifier, whether a pending order for a subscription account exists;

upon determining that a pending order for a subscription account does not exist, determine that or a new subscription account is to be created;

upon determining that the pending order exists, release the pending order; and upon determining at the activation server that the new subscription account is to be created, create the new subscription account, and instruct the client device to replace a second identifier for attaching to the network with the first identifier and use the first identifier to attach to the network.

16. The activation server of claim 15, the memory further comprising instructions which, when executed by the processor, cause the processor to:

upon determining at the activation server that the subscription request includes instructions for creating the new subscription account, provide, to the client device, an interface for selecting the new subscription account.

17. The activation server of claim 16, wherein the interface for selecting the new subscription account includes a limited network access limiting access to one or more of non-emergency voice calls, text messages, or network data access.

18. The activation server of claim 15, wherein the second identifier is a Globally Unique Temporary Identifier (GUTI), and wherein the first identifier is an International Mobile Subscriber Identifier (IMSI).

19. The activation server of claim 15, the memory further comprising instructions which, when executed by the processor, cause the processor to:

provide, to a subscribed data store, instructions for creating a subscriber profile for the client device; and notify a self-activation data store to remove the subscriber profile from the self-activation data store.

20. A method comprising:

receiving, from a client device, a request for accessing a network, wherein the request includes a first identifier of the client device;

determining that a subscription account exists for the client device to access the network;

determining that the subscription account has been updated; and sending, in response to determining that the subscription account exists and that the subscription account has been updated, instructions to the client device for removing the first identifier from the client device, and for using a second identifier for future access to the network.

21. The method of claim 20, wherein the first identifier is a Globally Unique Temporary Identifier (GUTI), and the second identifier is an International Mobile Subscriber Identifier (IMSI).

22. The method of claim 20, further comprising:

sending, in response to determining that the subscription account exists and that the subscription account has been updated, instructions to the client device for rebooting the client device.

* * * * *